US 011325331B2

(12) United States Patent
Nagayoshi

(10) Patent No.: US 11,325,331 B2
(45) Date of Patent: May 10, 2022

(54) TIRE MANUFACTURING METHOD

(71) Applicant: Toyo Tire Corporation, Itami (JP)

(72) Inventor: Hiraku Nagayoshi, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 16/589,412

(22) Filed: Oct. 1, 2019

(65) Prior Publication Data

US 2020/0108575 A1 Apr. 9, 2020

(30) Foreign Application Priority Data

Oct. 3, 2018 (JP) .............................. JP2018-188129

(51) Int. Cl.
*B29D 30/00* (2006.01)
*B29D 30/60* (2006.01)

(52) U.S. Cl.
CPC ......... *B29D 30/0061* (2013.01); *B29D 30/60* (2013.01); *B29D 2030/0077* (2013.01)

(58) Field of Classification Search
CPC ........ B29D 30/08; B29D 30/14; B29D 30/16; B29D 30/1621; B29D 30/1628; B29D 30/72; B29D 2030/0077; B29D 30/60; B60C 2019/004; B60C 2013/008; B60C 13/00; B60C 2011/0091; B60C 11/243
USPC ........................................... 156/110.1, 130.7
See application file for complete search history.

(56) References Cited

U.S. PATENT DOCUMENTS 2,849,049 A 8/1958 Hanson
6,923,879 B1 * 8/2005 Blickwedel ............ B29D 30/72
156/117

2002/0056496 A1 5/2002 Tanaka et al.
2004/0252072 A1 * 12/2004 Adamson ......... G06K 19/07749
343/873
2008/0190540 A1 8/2008 Hashimura et al.
(Continued)

FOREIGN PATENT DOCUMENTS

CN 101209651 A 7/2008
JP 2001-191423 A 7/2001
(Continued)

OTHER PUBLICATIONS

Toru Tsuda, JP-2005047016-A, updated machine translation. (Year: 2005).*
(Continued)

*Primary Examiner* — Katelyn W Smith
*Assistant Examiner* — Sedef E Paquette
(74) *Attorney, Agent, or Firm* — Maier & Maier, PLLC

(57) ABSTRACT

In a manufacturing method of a tire which manufactures a side-wall rubber as a constituent member of the tire by winding a rubber strip formed of unvulcanized rubber on a carcass ply serving as a rotating body, the method includes the steps of: winding the rubber strip prior to vulcanization in a spiral manner having a partially overlapping region, so that at least part thereof is exposed at an outer surface, and another portion thereof is covered by the rubber strip after being wound; and arranging an electronic component so that the electronic component is positioned in the partially overlapping region of the rubber strip or between the carcass ply, etc. serving as the lower layer member of the rubber strip and the rubber strip, in the winding step or an earlier step thereto.

6 Claims, 12 Drawing Sheets

(56) References Cited

U.S. PATENT DOCUMENTS

2008/0289736 A1    11/2008  Adamson et al.
2014/0174637 A1*   6/2014   Chevaux ............ B29D 30/1628
                                                156/117
2017/0225524 A1*   8/2017   Tamura ............... B60C 23/0493

FOREIGN PATENT DOCUMENTS

| JP | 2002-018973 A |   | 1/2002  |
|----|---------------|---|---------|
| JP | 2002-079590 A |   | 3/2002  |
| JP | 2005-047016 A |   | 2/2005  |
| JP | 2006-240200 A |   | 9/2006  |
| JP | 2006231533  A | * | 9/2006  |
| JP | 2006312284  A | * | 11/2006 |
| JP | 2008-265750 A |   | 11/2008 |
| JP | 2017105084  A | * | 6/2017  |

OTHER PUBLICATIONS

Shinichi Kimura, JP-2006312284-A, machine translation. (Year: 2006).*
Hideyuki Hasegawa, JP-2017105084-A, machine translation. (Year: 2017).*
Nobuyuki Hirai, JP-2006231533-A, machine translation. (Year: 2006).*
Notice of Reasons for Rejection dated Jun. 4, 2019 in corresponding JP Application No. 2018-188129; 7 pgs.
Decision to Grant a Patent dated Aug. 13, 2019 in corresponding JP Application No. 2018-188129; 4 pgs.

* cited by examiner

TIRE MANUFACTURING METHOD

CROSS-REFERENCE TO RELATED APPLICATIONS

This application is based on and claims the benefit of priority from Japanese Patent Application No. 2018-188129, filed on 3 Oct. 2018, the content of which is incorporated herein by reference.

FIELD

The present invention relates to a manufacturing method of a tire in which an electronic component is embedded.

BACKGROUND

Conventionally, a tire embedding an electronic component such as an RFID tag has been known. With such a tire, it is possible to carry out production management of the tire, usage history management, etc. by the RFID tag embedded in the tire and a reader as external equipment carrying out communication. For example, Japanese Unexamined Patent Application, Publication No. 2008-265750 discloses a tire arranging an electronic component at a boundary surface of two different substances.

SUMMARY

According to the technology illustrated in Japanese Unexamined Patent Application, Publication No. 2008-265750, it is possible to carry out production management, shipping management, usage history management, etc. of tires. However, in the technology illustrated in Japanese Unexamined Patent Application, Publication No. 2008-265750, since the electronic component is arranged at a boundary surface between two different substances, it has not been able to embed the electronic component at any position among rubber components constituting the tire.

The present invention has been made taking account of the above-mentioned problem, and an object thereof is to provide a manufacturing method for a tire having a high degree of freedom in arrangement of an electronic component, which enables adjusting the embedding position from a tire outer surface.

A tire manufacturing method for a tire according to a first aspect of the present invention manufactures a constituent member of the tire by winding a rubber strip consisting of unvulcanized rubber on a rotating body, the method including the steps of: winding the rubber strip prior to vulcanization in a spiral manner having a partially overlapping region, so that at least part thereof is exposed at an outer surface, and another portion thereof is covered by the rubber strip after being wound; and arranging an electronic component so that the electronic component is positioned in the partially overlapping region of the rubber strip or between a lower layer member of the rubber strip and the rubber strip, in the winding step or an earlier step thereto.

According to a second aspect of the present invention, in the tire manufacturing method as described in the first aspect, in the arranging step, the electronic component may be arranged at the rubber strip after being wound on the rotating body.

According to a third aspect of the present invention, in the tire manufacturing method as described in the first aspect, in the arranging step, the electronic component may be arranged at the rubber strip prior to being wound on the rotating body.

According to a fourth aspect of the present invention, in the tire manufacturing method as described in any one of the first to third aspects, in the winding step of the rubber strip, a first layer may be wound so as to cover the lower layer member of the rubber strip, a second layer may be wound so that at least part of the first layer is exposed at an outer surface, a third layer may be wound so that at least part of the second layer is exposed at the outer surface, and a fourth layer may be wound so that at least part of the third layer is exposed at the outer surface; and in the arranging step, the electronic component may be disposed at any position among between the lower layer member of the rubber strip and the first layer of the rubber strip, between the first layer and the second layer, between the second layer and the third layer, and between the third layer and the fourth layer.

According to a fifth aspect of the present invention, in the tire manufacturing method as described in any one of the first to fourth aspects, the rubber strip may have a sloped face in at least a part thereof, and the electronic component may be arranged at the sloped face in the arranging step.

According to a sixth aspect of the present invention, in the tire manufacturing method as described in any one of the first to fifth aspects, layer of the rubber strip at which arranging the electronic component may be selected in the arranging step based on a desired embedding depth position from the tire outer surface, and a desired arrangement position in a tire-radial direction.

According to a seventh aspect of the present invention, the tire manufacturing method as described in any one of the first to sixth aspects may further include: a step of filling rubber inside a spring antenna of an electronic component; and a step of interposing by rubber sheets the electronic component having the spring antenna in which rubber was filled, in which the electronic component interposed by the rubber sheets may be arranged so that the electronic component is positioned in a the partially overlapping region of the rubber strip, or between the lower layer member of the rubber strip and the rubber strip, in the arranging step.

According to the present invention, it is possible to provide a manufacturing method for a tire having a high degree of freedom in arrangement of an electronic component, which enables adjusting the embedding position from a tire outer surface.

DETAILED DESCRIPTION

First Embodiment

Figure 1:
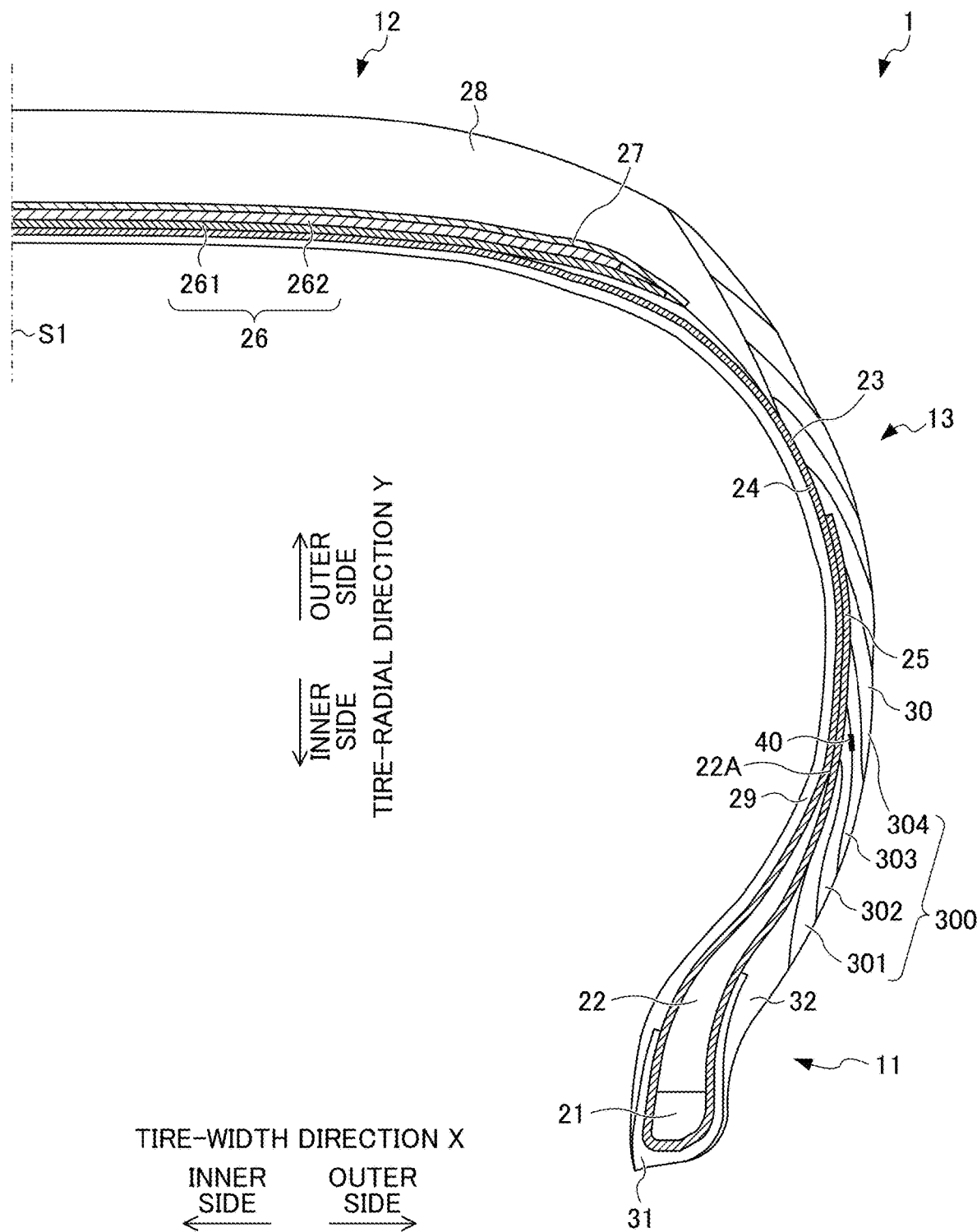
FIG. 1 is a view showing a half section in a tire-width direction of a tire according to a first embodiment of the present invention.

Hereinafter, a first embodiment of the present invention will be explained while referencing the drawings. FIG. 1 is a view showing a half section in a tire-width direction of a tire 1 according to the present embodiment. The basic structure of the tire is left/right symmetric in the cross section of the tire-width direction; therefore, a cross-sectional view of the right half is shown herein. In the drawings, the reference symbol S1 is the tire equatorial plane. The tire equatorial plane S1 is a plane orthogonal to the tire rotation axis, and is positioned in the center of the tire-width direction. Herein, tire-width direction is a direction parallel to the tire rotation axis, and is the left/right direction of the paper plane of the cross-sectional view in FIG. 1. In FIG. 1, it is illustrated as the tire-width direction X. Then, inner side of tire-width direction is a direction approaching the tire equatorial plane S1, and is the left side of the paper plane in FIG. 1. Outer side of tire-width direction is a direction distancing from the tire equatorial plane S1, and is the right side of the paper plane in FIG. 1. In addition, tire-radial direction is a direction perpendicular to the tire rotation axis, and is the vertical direction in the paper plane of FIG. 1. In FIG. 1, it is illustrated as the tire-radial direction Y. Then, outer side of tire-radial direction is a direction distancing from the tire rotation axis, and is the upper side of the paper plane in FIG. 1. Inner side of tire-radial direction is a direction approaching the tire rotation axis, and is the lower side of the paper plane in FIG. 1. The same also applies to FIGS. 2, and 4 to 9.

The tire 1 is a tire for passenger cars, for example, and includes a pair of beads 11 provided at both sides in the tire-width direction, a tread 12 forming the contact patch with the road surface, and a pair of side walls 13 extending between the pair of beads 11 and the tread 12.

The bead 11 includes an annular bead core 21 formed by wrapping around several times bead wires made of metal coated with rubber, and a bead filler 22 of tapered tip shape extending to the outer side in the tire-radial direction of the bead core 21. The bead core 21 is a member which plays a role of fixing a tire filled with air to the rim of a wheel which is not illustrated. The bead filler 22 is a member provided in order to raise the rigidity of the bead peripheral part and to ensure high maneuverability and stability, and is configured from rubber of a higher modulus than the surrounding rubber members, for example.

A carcass ply 23 constituting a ply serving as the skeleton of the tire is embedded inside of the tire 1. The carcass ply 23 extends from one bead core to the other bead core. In other words, it is embedded in the tire 1 between the pair of bead cores 21, in a form passing through the pair of side walls 13 and the tread 12. As shown in FIG. 1, the carcass ply 23 includes a ply body 24 which extends from one bead core to the other bead core, and extends between the tread 12 and bead 11, and a ply folding part 25 which is folded around the bead core 21. In the present embodiment, the ply folding part 25 is overlapped with the ply body 24. The carcass ply 23 is configured by a plurality of ply cords extending in the tire-width direction. In addition, a plurality of ply cords is arranged side by side in a tire circumferential direction. This ply cord is configured by an insulated organic fiber cord such as polyester or polyamide, or the like, and is covered by rubber.

In the tread 12, at least one ring-shaped steel belt 26 which extends in a circumferential direction of the tire is provided in the outer side in the tire-radial direction of the carcass ply 23. The steel belt 26 is configured by a plurality of steel cords covered by rubber. By providing the steel belts 26, the rigidity of the tire is ensured, and the contact state of the road surface with the tread 12 improves. In the present embodiment, although two layers of steel belts 261, 262 are provided, the number of layered steel belts 26 is not limited thereto.

At the outer side in the tire-radial direction of the steel belt 26, a cap ply 27 serving as a belt reinforcement layer is provided. The cap ply 27 is configured from an insulating organic fiber layer such as of polyamide fibers, and is covered by rubber. By providing the cap ply 27, it is possible to achieve an improvement in durability and a reduction in road noise while travelling.

The tread rubber 28 is provided at the outer side in the tire-radial direction of the cap ply 27. A tread pattern (not illustrated) is provided to the outer surface of the tread rubber 28, and this outer surface serves as a contact patch which contacts with the road surface.

In the bead 11, side wall 13 and tread 12, an inner liner 29 serving as a rubber layer constituting an inside wall surface of the tire 1 is provided to a tire inner cavity side of the carcass ply 23. The inner liner 29 is configured by air permeation resistant rubber, whereby the air inside the tire inner cavity is prevented from leaking to outside.

In the side wall 13, the side wall rubber 30 constituting the outer wall surface of the tire 1 is provided to the outer side in the tire-width direction of the carcass ply 23. This side wall rubber 30 is a portion which bends the most upon the tire exhibiting a cushioning action, and usually flexible rubber having fatigue resistance is adopted therein. In the present embodiment, the side-wall rubber 30 is formed by a ribbon winding method. The details thereof are described later.

A chafer 31 is provided on the inner side in the tire-radial direction of the carcass ply 23 provided around the bead core 21 of the bead 11. The chafer 31 also extends to the outer side in the tire-width direction of the ply folding part 25 of the carcass ply 23, and rim strip rubber 32 is provided at the outer side in the tire-width direction thereof and the inner side in the tire-radial direction. The outer side in the tire-width direction of this rim strip rubber 32 connects with the side wall rubber 30.

An RFID tag 40 is embedded as an electrical component in the tire 1 of the present embodiment. The RFID tag 40 is a passive transponder equipped with an RFID chip and an antenna for performing communication with external equipment, and performs wireless communication with a reader (not illustrated) serving as the external equipment. As the antenna, a coil-shaped spring antenna, plate-shaped antenna, and various types of rod-shaped antennas can be used. For example, it may be an antenna formed by printing a predetermined pattern on a flexible substrate. The antenna is set to an optimized antenna length, according to the frequency band, etc. to be used. In a storage part inside the RFID chip, identification information such as a manufacturing number and part number is stored.

Figure 2:
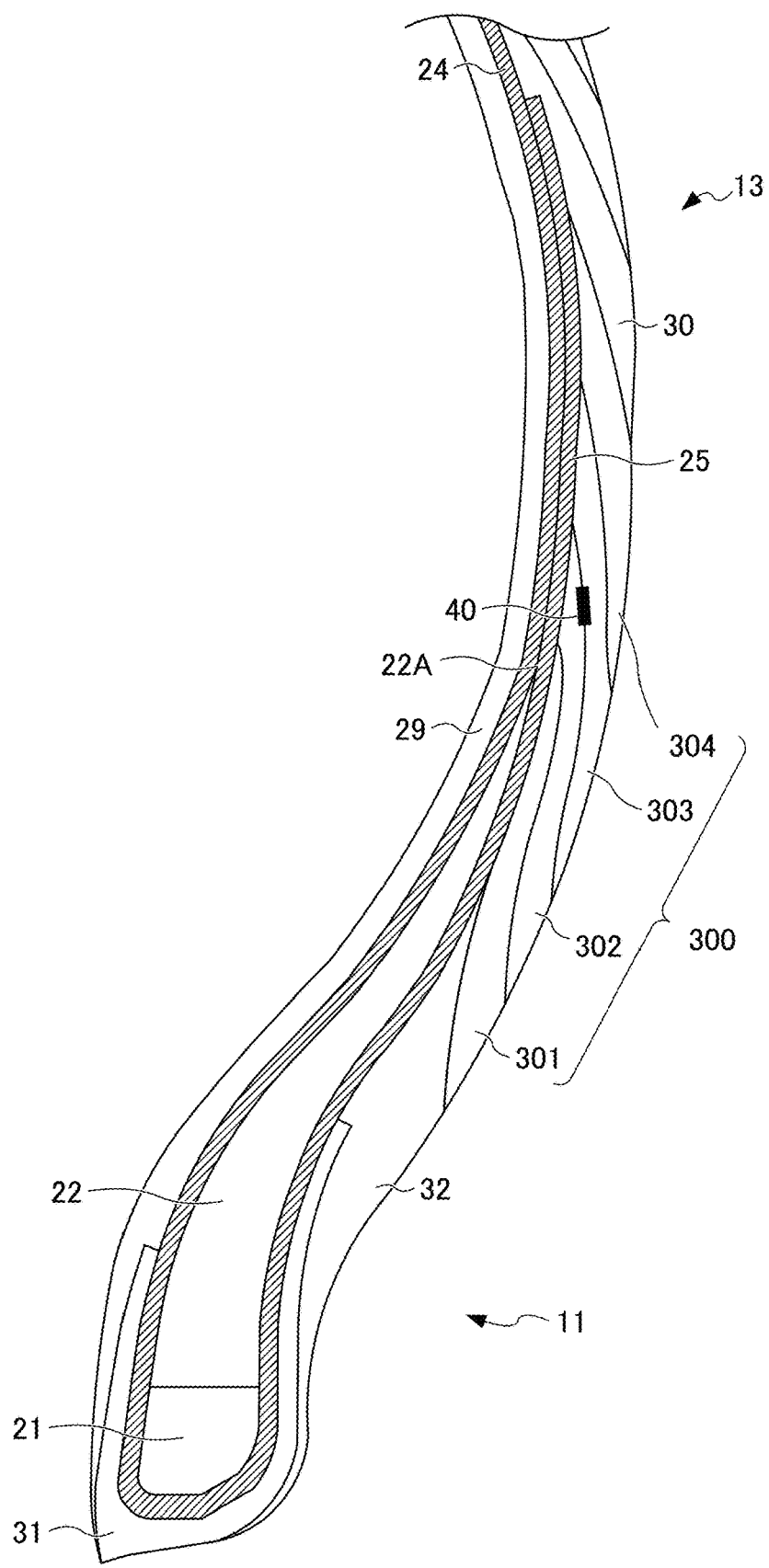
FIG. 2 is a partially enlarged view of a tire according to the first embodiment of the present invention.

FIG. 2 is an enlarged cross-sectional view showing around the embedded part of the RFID tag 40. As shown in FIGS. 1 and 2, the RFID tag 40 is embedded inside the side-wall rubber 30.

Herein, the side-wall rubber 30 is formed by a known ribbon winding method. With this method, on a molding drum which is not illustrated, the carcass ply 23 is arranged as a rotating body to which the tread rubber 28, etc. is provided, and the molding drum on which the carcass ply 23 serving as this rotating body is arranged is made to rotate. Then, using a sticking roller which is not illustrated, the rubber strip 300 is wound in a spiral manner on the lateral face of the carcass ply 23 which is rotating. More specifically, in a state rotating the molding drum, the rubber strip 300 is shifted little by little in the tire-radial direction, while pressing and pasting the rubber strip 300 to the side of the carcass ply 23 using the sticking roller. The rubber strip 300 is wound in a form sticking in a spiral manner to a lateral face of the carcass ply 23. More specifically, as shown in FIGS. 1 and 2, in the rubber strip 300, the first layer 301 is wound so as to cover the carcass ply 23, etc. as a lower layer member of the rubber strip 300, the second layer 302 is wound so that at least part of the first layer 301 is exposed at the outer surface, the third layer 303 is wound so that at least part of the second layer 302 is exposed at the outer surface, and the fourth layer 304 is wound so that at least part of the third layer 303 is exposed at the outer surface. In this way, the rubber strip 300 is wound in a spiral manner relative to a lower layer member, and the side-wall rubber 300 is formed finally.

At this time, as shown in FIGS. 1 and 2, the rubber strip 300 is wound in a spiral manner so as to partially overlap. Therefore, among the rubber strip 300, a portion not overlapping upon winding is exposed at the outer surface. It should be noted that, although an example in which the rubber strip 300 is wound in a spiral matter from a side of the rim strip rubber 32 towards the side of the tread rubber 28 is shown in FIGS. 1 and 2, the winding direction is not limited thereto. For example, it may be wound from the side of the tread rubber 28 towards the side of the rim strip rubber 32. In addition, only part of the side-wall rubber 30, e.g., only a region on the outer side in the tire-radial direction, may be formed by the ribbon winding method.

The RFID tag 40 is arranged at an overlapping portion of rubber strips, or between the first layer 301 of the rubber strip 300, and the carcass ply 23 or rim strip rubber 32. In the present embodiment, it is arranged between the second layer 302 and the third layer 303 of the rubber strip 300.

Next, an arrangement process of arranging the RFID tag 40 inside a tire will be explained. As mentioned earlier, the side-wall rubber 30 is formed by a ribbon winding method. In other words, to the molding drum which is not illustrated, the carcass ply 23 to which the rim strip rubber 32, tread rubber 28, etc. are provided is arranged, and this molding drum is made to rotate. Then, using the sticking roller which is not illustrated, the rubber strip 300 is pressed to the lateral face of the carcass ply 23 which is rotating.

In the present embodiment, after winding the second layer 302 of the rubber strip 300 on the carcass ply 23, the RFID tag 40 is pasted to a portion of the outer surface of the second layer 302 which overlaps with the third layer 303, and subsequently, the third layer 303 and later layers of the rubber strip 300 are wound on the carcass ply 23. In other words, it includes a step of arranging the RFID tag 40 serving as the electronic component, on the rubber strip 300 wound on the molding drum and carcass ply 23 which serves as the rotating body.

Otherwise, after winding the second layer 302 of the rubber strip 300 on the carcass ply 23, the RFID tag 40 may be pasted to a portion of the inner surface side of the third layer 303 which overlaps with the second layer 302, and subsequently, the third layer 303 and later layers of the rubber strip 300 may be wound on the carcass ply 23.

Alternatively, the RFID tag 40 may be pasted in advance to the second layer 302 or third layer 303 of the rubber strip 300, and the second layer 302 and third layer 303 may be continuously wound. In other words, it may include a step of arranging the RFID tag 40 serving as the electronic component, on the rubber strip 300, prior to winding on the molding drum and the carcass ply 23 as the rotating body.

According to such a step, it is possible to arrange the RFID tag 40 between the second layer 302 and third layer 303 of the rubber strip 300. In other words, it is possible to embed the RFID tag 40 inside the side-wall rubber 30.

However, as the embedding position of the electronic component such as the RFID tag 40, the appropriate embedding depth position differs according to the type of electronic component, type of tire, etc. In addition, considering the communication stability of the electronic component and protection to shock, there are cases of wanting to embed at a close distance from the outer surface, case of wanting to embed at a far distance from the outer surface, etc.

Herein, in the present embodiment, the boundary surface between the second layer 302 and third layer 303 of the rubber strip 300 extends from the deepest part contacting with the carcass ply 23 until the outer surface of the side-wall rubber 30.

Consequently, the RFID tag 40 can be arranged by fine tuning the embedding depth thereof, at any position from the contacting part with the carcass ply 23, which is the deepest part of the side-wall rubber 30, until the side-wall rubber outer surface.

Figure 3A:
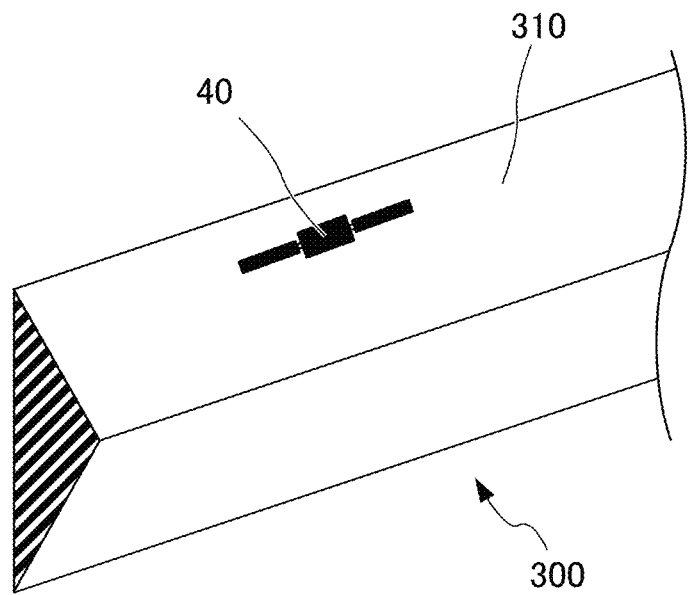
FIG. 3A is a view showing an example of the shape of a rubber strip.
Figure 3B:
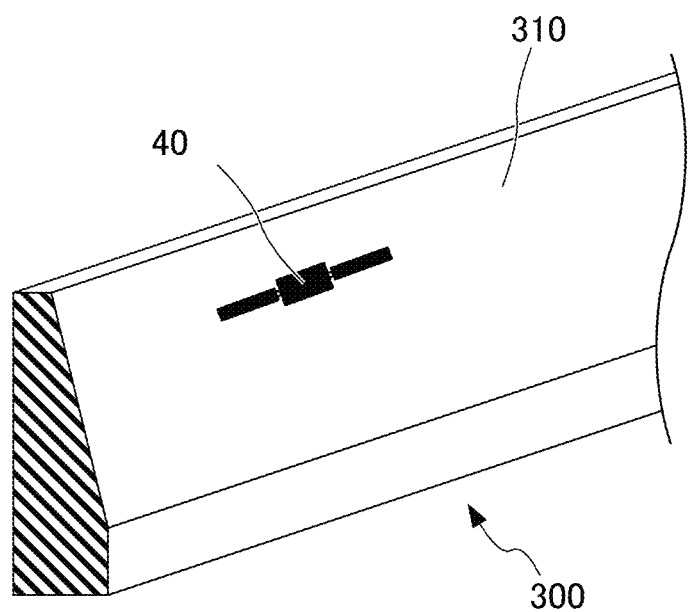
FIG. 3B is a view showing an example of the shape of a rubber strip.

It should be noted that the rubber strip 300 is not limited to a simple cross-sectional rectangular shape, and may adopt a rubber strip of cross-sectional shape having a sloped surface in at least a part, in accordance with the way of winding thereof and the finish shape of the side-wall rubber 30. For example, a cross-sectional triangular rubber strip 300 such as that shown in FIG. 3A, or a rubber strip 300 of cross-sectional shape having a sloped face on one side such as that shown in FIG. 3B may be used. Then, the RFID tag 40 may be arranged at a portion 310 which is the sloped face in the cross section. By using such a rubber strip 300, and winding the rubber strip 300 in a spiral manner so that the sloped-face portion overlaps, the finish shape of the side-wall rubber 30 is also favorable. In addition, it is possible to interpose the RFID tag 40 between layers of the rubber strip 300 reliably. Furthermore, it is easy to embed to match the longitudinal direction of the RFID tag 40 with the direction of a tangential line to the circumferential direction of the tire, i.e. direction orthogonal to the paper plane of the cross-sectional view of FIGS. 1 and 2. By embedding in such a direction, stress hardly acts on the RFID tag 40, even when the tire deforms.

Next, an example of the arrangement position of the RFID tag 40 will be shown in the present embodiment. FIGS. 4 to 8 are enlarged cross-sectional views showing examples of the arrangement position of the RFID tag 40 in the present embodiment.

Figure 4:
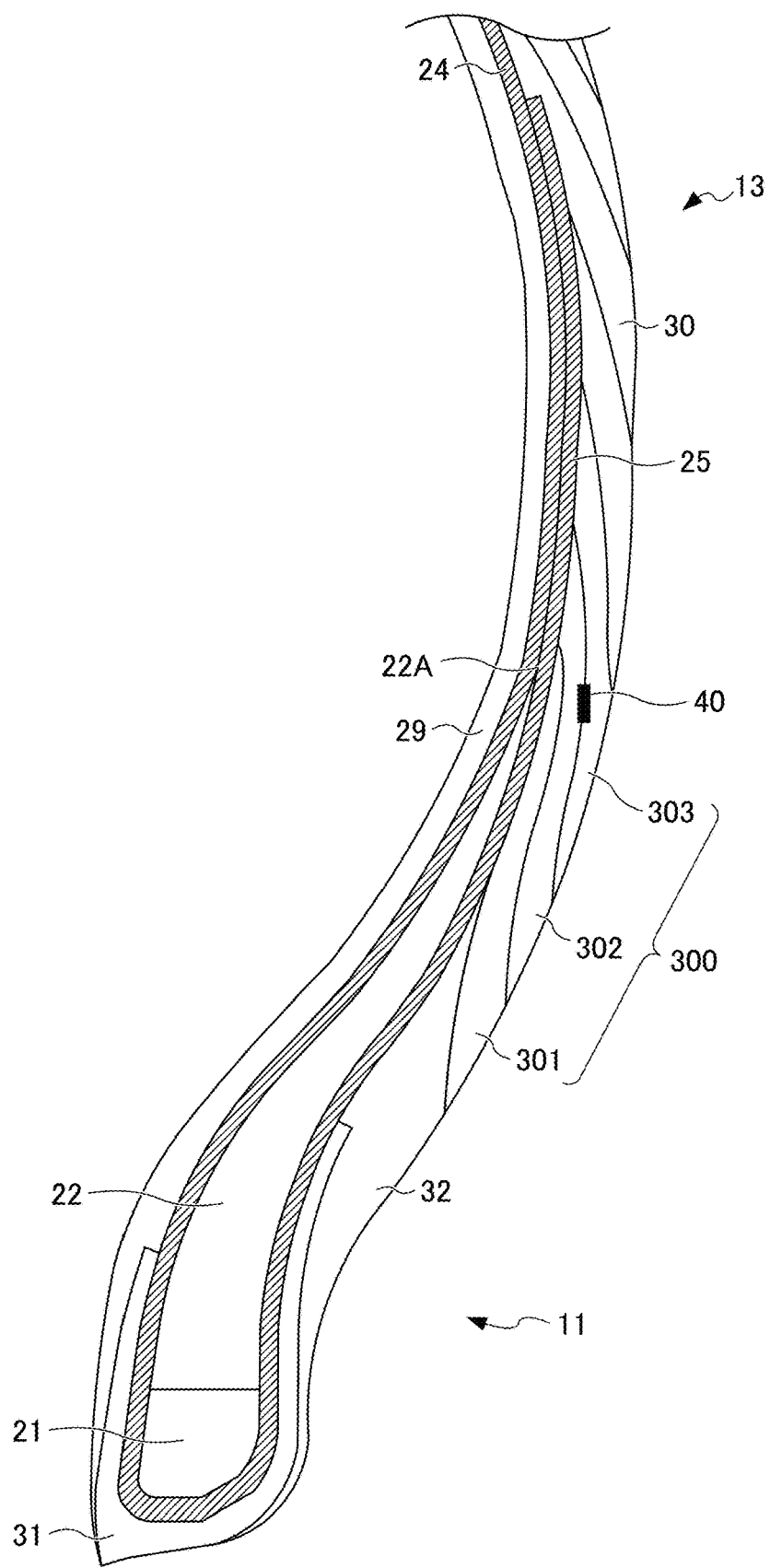
FIG. 4 is an enlarged cross-sectional view of a tire showing an example of an arrangement position of an RFID tag.
Figure 5:
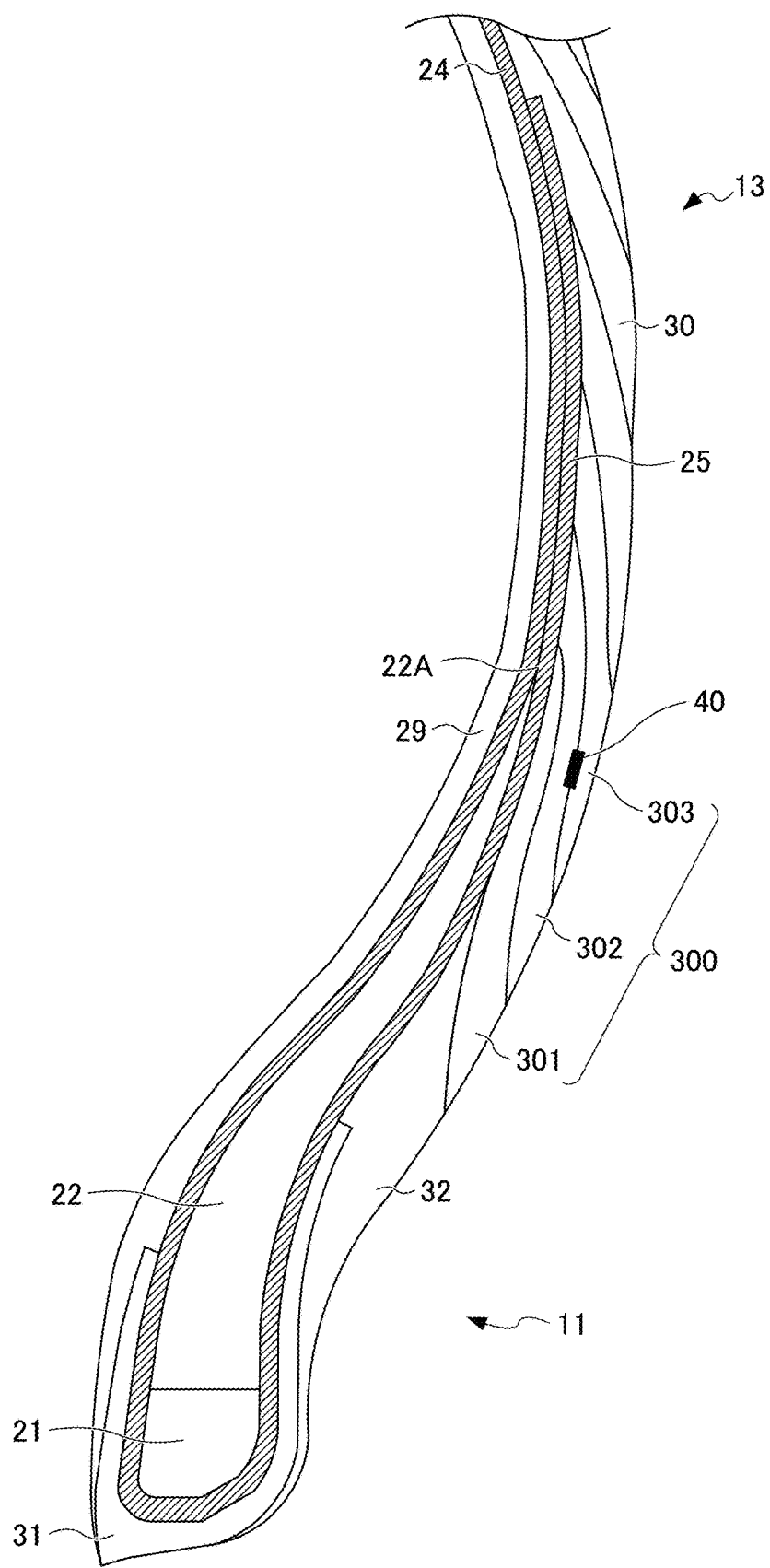
FIG. 5 is an enlarged cross-sectional view of a tire showing an example of an arrangement position of an RFID tag.

For example, in the case of wanting to make the RFID tag 40 approach the outer surface slightly, the arrangement step mentioned earlier is set so that the RFID tag 40 is arranged at the position shown in FIG. 4. In addition, in the case of wanting to make the RFID tag 40 further approach the outer surface, the arrangement step is set so that the RFID tag 40 is arranged at the position shown in FIG. 5. In this way, it is possible to perform fine tuning of the embedding depth of the RFID tag 40, in the dimension range of no more than the thickness of the rubber strip 300.

Figure 6:
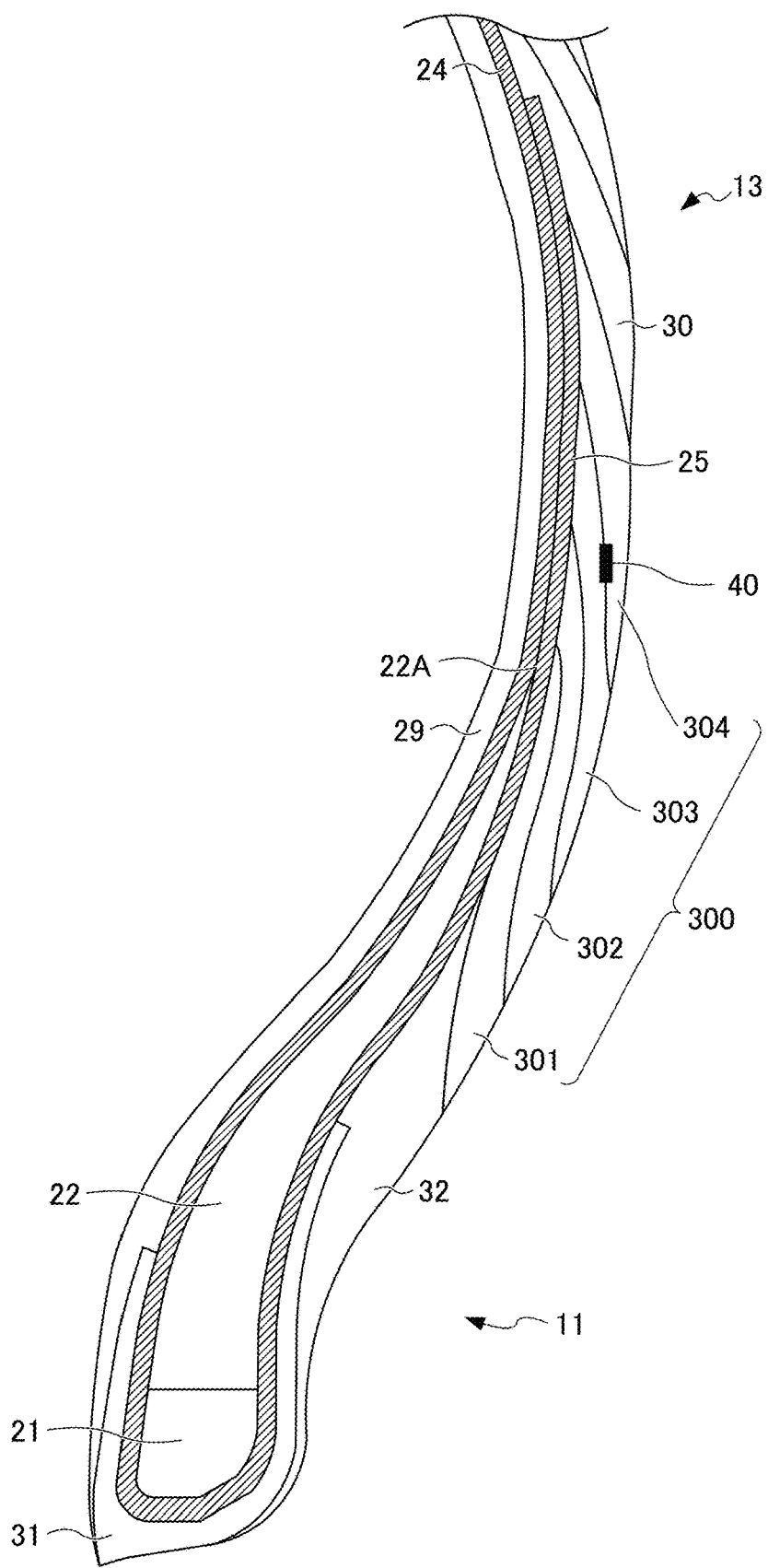
FIG. 6 is an enlarged cross-sectional view of a tire showing an example of an arrangement position of an RFID tag.

It should be noted that, as shown in FIG. 6, the RFID tag 40 may be arranged between the third layer 303 and fourth layer 304 of the rubber strip 300.

Figure 7:
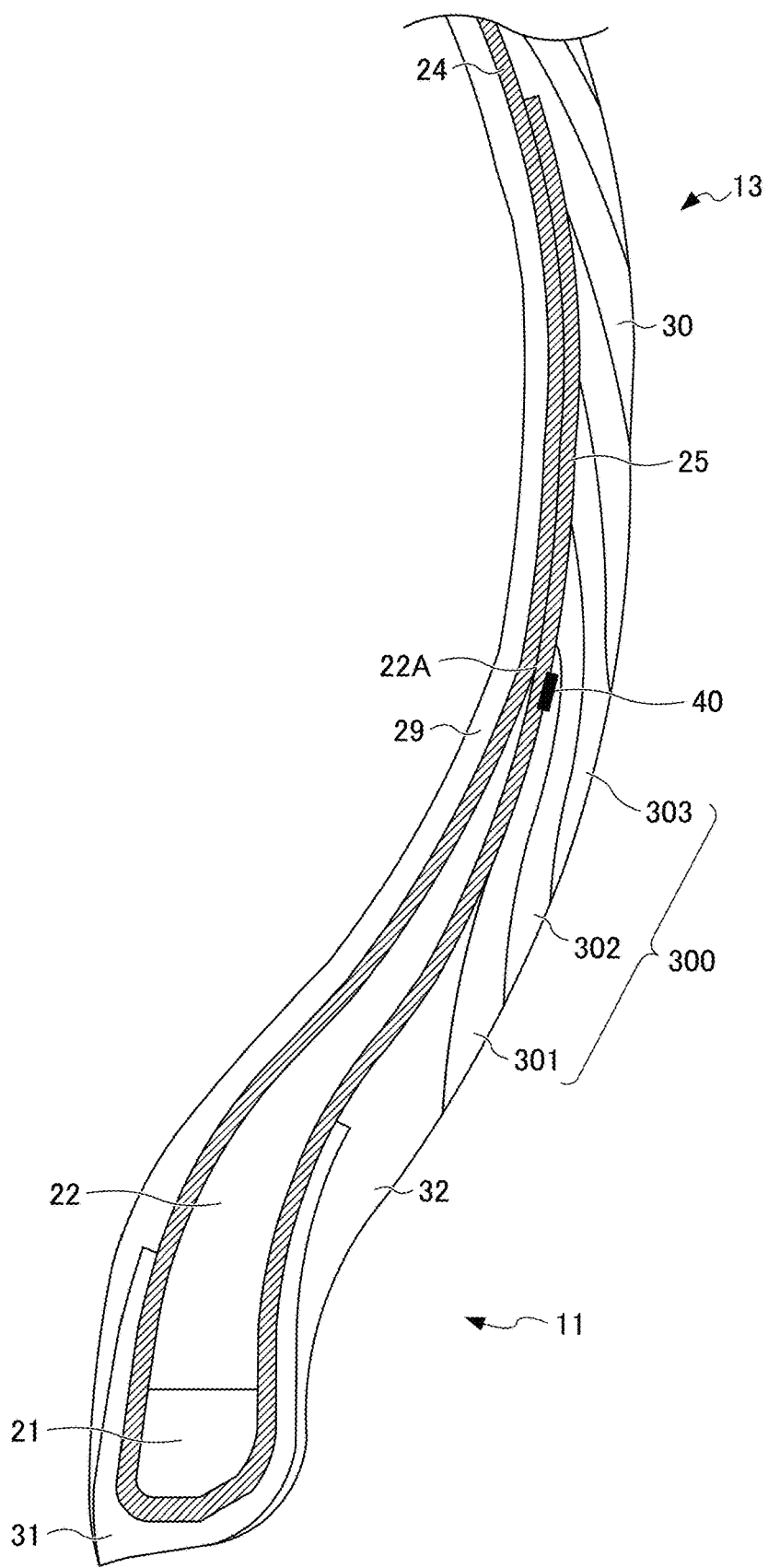
FIG. 7 is an enlarged cross-sectional view of a tire showing an example of an arrangement position of an RFID tag.
Figure 8:
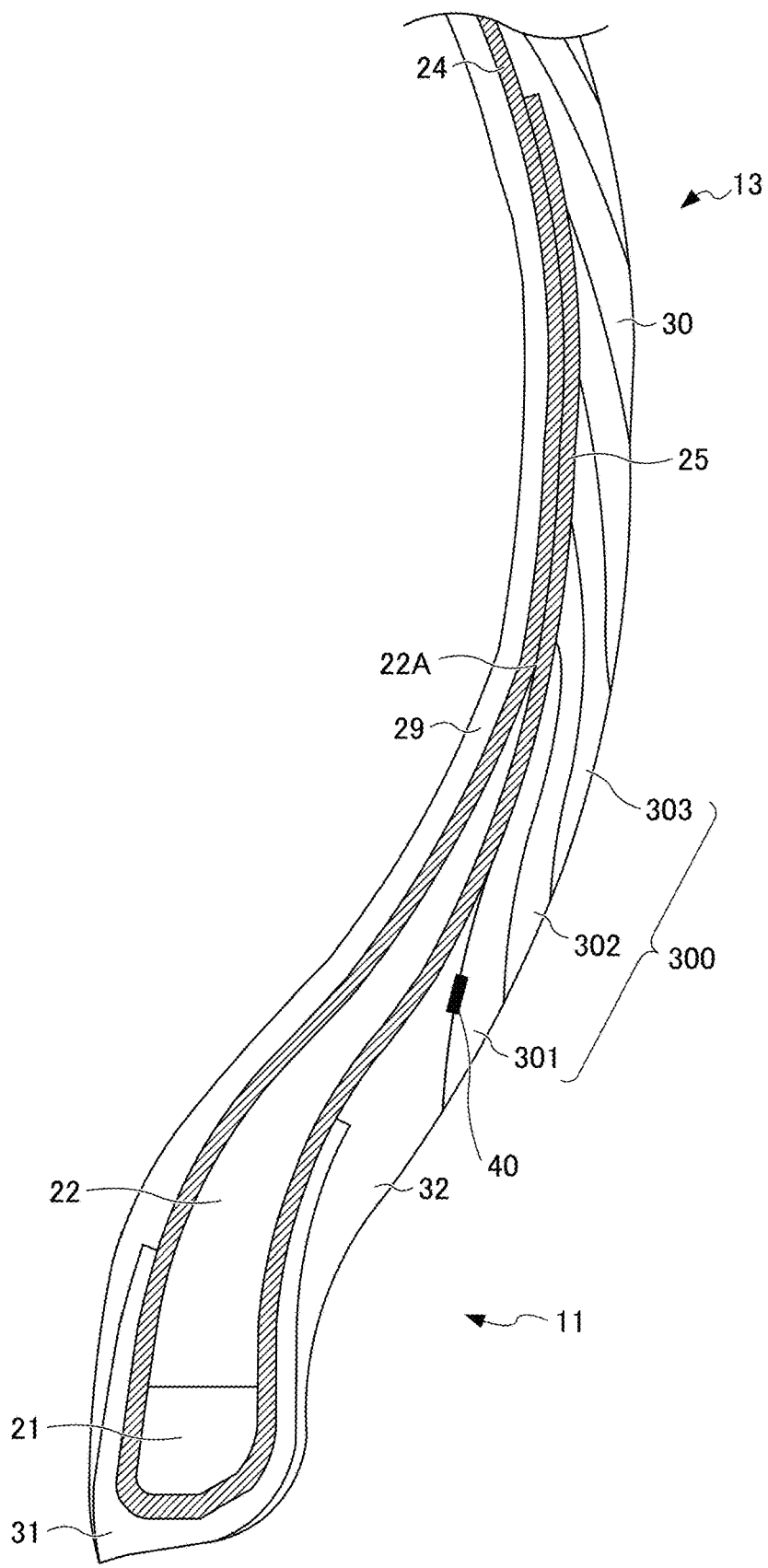
FIG. 8 is an enlarged cross-sectional view of a tire showing an example of an arrangement position of an RFID tag.

In addition, as shown in FIG. 7, the RFID tag 40 may be arranged between the first layer 301 of the rubber strip 300 and the carcass ply 23 as the lower layer member of the rubber strip. In this case, the RFID tag 40 on the carcass ply 23 comes to be embedded in the side-wall rubber 30, by being covered by the side-wall rubber 30. In addition, as shown in FIG. 8, the RFID tag 40 may be arranged between the first layer 301 of the rubber strip 300, and the rim strip rubber 32 as the lower layer member of the rubber strip. In the configurations of FIGS. 7 and 8, since the RFID tag 40 is arranged in the vicinity of the tire-radial direction outside end 22A of the bead filler 22, or the vicinity of the bead filler 22, which are positions at which the distortion of the tire is relatively small, the RFID tag 40 is hardly damaged.

Herein, in addition to the point of how deep of a position it is desired to arrange the RFID tag 40 from the outer surface, it is selected in what layer of the rubber strip to arrange the RFID tag 40 from the point of which region in the tire-radial direction to arrange.

In other words, in the manufacturing method of the present embodiment, presuming as being a manufacturing method forming the side-wall rubber 30 from the rubber strip 300 wound in a spiral manner so as to partially overlap, then upon executing the arrangement process of arranging the RFID tag 40 inside the tire, a step of selecting a layer of the rubber strip 300 at which to arrange the RFID tag 40 as the electronic component is carried out based on the desired embedding depth position from the tire outer surface, and the desired arrangement position in the tire-radial direction.

Figure 9:
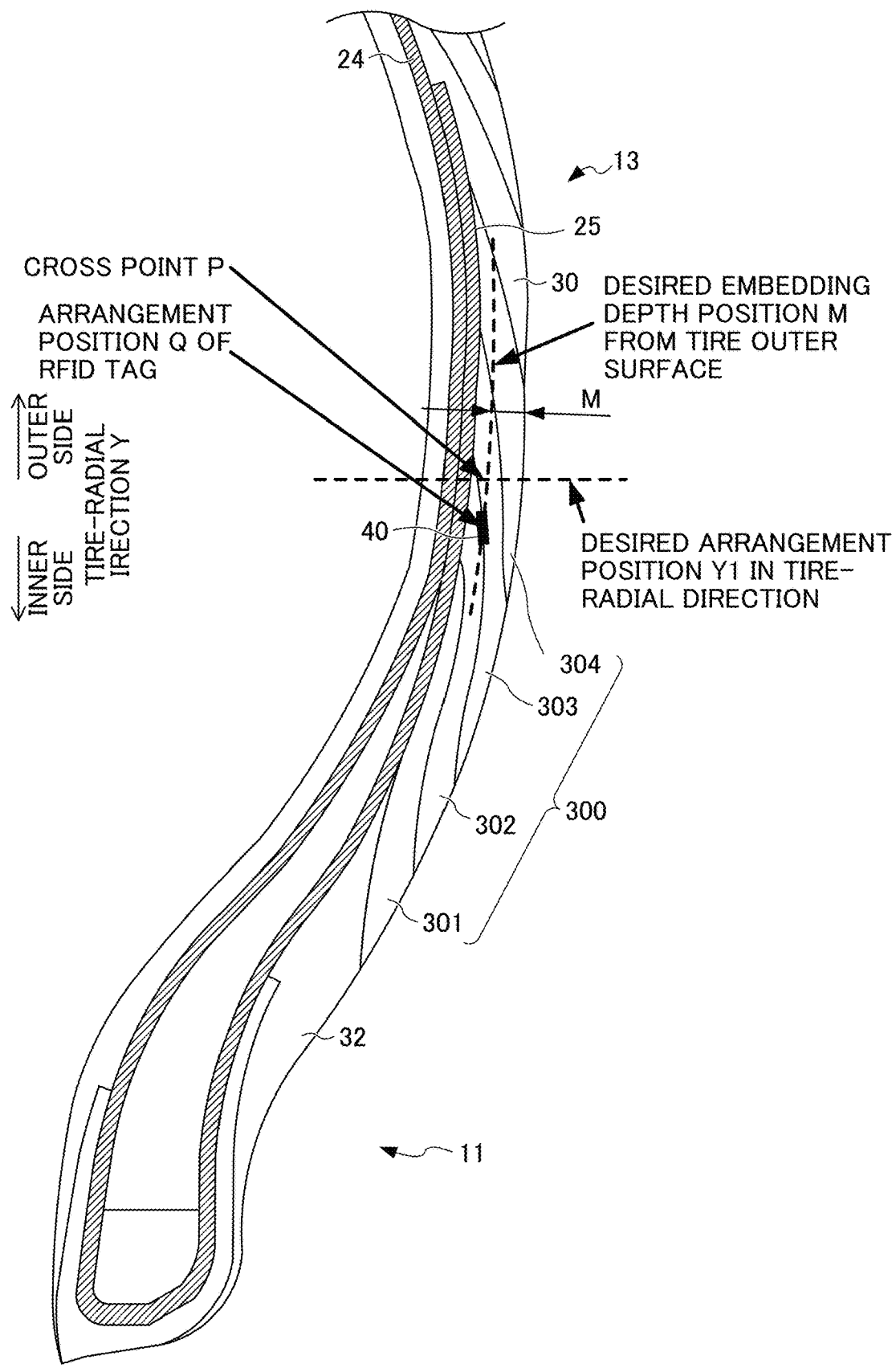
FIG. 9 is an enlarged cross-sectional view of a tire for explaining a layer selection step of selecting a layer of a rubber strip at which arranging the RFID tag, based on a desired embedding depth position from the tire outer surface and a desired arrangement position in the tire-radial direction.

In this case, among the interlayer positions of the rubber strip 300, etc. at which it is possible to arrange the RFID tag 40, as shown in FIG. 9, for example, the embedding position Q of the RFID tag 40 is set, and the layer of the rubber strip 300 at which arranging the RFID tag 40 is selected based on a cross point P between the desired embedding depth position M from the tire outer surface and the desired arrangement position Y1 in the tire-radial direction. FIG. 9 shows a state in which, for example, "second layer 302" in which the RFID tag 40 is placed is selected as the layer at which arranging the RFID tag 40. It should be noted that, as the selection of the layer, the location at which the RFID tag 40 is arranged may be specified, and in the case of the example shown in FIG. 9, it may be considered that "third layer 303" covering the RFID tag 40 was selected, or it may be considered that between "second layer 302" and "third layer 303" was selected. It should be noted that, among the desired embedding depth position M from the tire outer surface and the desired arrangement position Y1 in the tire-radial direction, either one may be prioritized, and this selection step may be performed. Generally, more detailed position adjustment is required for the embedding depth position from the tire outer surface than the arrangement position in the tire-radial position. Consequently, as shown in FIG. 9, on the premise of embedding at the desired embedding depth position M from the tire outer surface, an interlayer position, etc. of the rubber strip 300 closest to the desired arrangement position Y1 in the tire-radial direction may be determined as the layer of the rubber strip 300 at which arranging the RFID tag 40. In the example shown in FIG. 9, the interlayer closest to the cross point P on the dotted line of the embedding depth position M is the interlayer of the second layer 302 and third layer 303; therefore, the second layer 302 (between the second layer 302 and third layer 303) is selected as the layer at which arranging the RFID tag 40. It should be noted that the desired embedding depth position M from the tire outer surface and the desired arrangement position Y1 in the tire-radial direction may each have ranges. It should be noted that a desired separation distance from the carcass ply 23 may be used in place of the desired embedding depth position M from the tire outer surface.

This selection step may be executed by a computer to which a program is installed. In this case, the user inputs the desired embedding depth position M from the tire outer surface and the desired arrangement position Y1 in the tire-radial direction. The computer selects the layer of the rubber strip at which arranging the RFID tag based on the inputted information.

It should be noted that the layer of the rubber strip 300 at which arranging the RFID tag 40 is preferably selected from among the first layer to third layer. In other words, it is selected from among the bottom layer of the first layer 301, interlayer between the first layer 301 and second layer 302, interlayer between the second layer 302 and third layer 303, and interlayer between the third layer 303 and fourth layer 304. In the case of adopting a mode pasting the RFID tag 40 to the rubber strip 300 in advance, when the RFID tag 40 arranged at a position wound at a relatively early stage, a situation such that the RFID tag 40 peels off in the winding process of the rubber strip 300 hardly occurs. In addition, in a case of winding the rubber strip 300 from the inner side in the tire-radial direction, so long as arranging the RFID tag 40 from the first layer to the third layer, due to becoming a distance relatively close to the bead filler, which is rubber of high modulus, the RFID tag 40 will be hardly damaged.

Herein, the RFID tag 40 is attached prior to the vulcanization process of the green tire. In the present embodiment, the RFID tag 40 is attached to any of the rubber strip 300, rim strip rubber 32 and coating rubber of the carcass ply 23, which are raw rubber before vulcanization. Since these rubbers are in the state of raw rubber before vulcanization, it is possible to paste the RFID tag 40 employing the adhesiveness thereof. Alternatively, it may be pasted using an adhesive or the like. It should be noted that the rubber strip 300 forming the side-wall rubber 30 having relatively low modulus is favorable as a member which pastes the RFID tag 40 due to the adherence being good prior to vulcanization. In particular, the rubber strip 300 immediately after extrusion molding has very good adherence. Then, after the ribbon winding method, the green tire in which the respective constituent members including the RFID tag 40 are assembled is vulcanized in the vulcanization process to manufacture the tire.

It should be noted that the RFID tag 40 may be embedded inside the side-wall rubber 30 in a state covered by a protective member of rubber or the like; however, it may be embedded inside the side-wall rubber 30 directly, without covering by the protective member. In this case, since it is possible to minimize the volume of a member embedded in the side-wall rubber 30, it is possible to reduce the influence on the tire 1.

It should be noted that, although the RFID tag 40 is embedded in the tire as the electronic component in the present embodiment, the electronic component embedded in the tire is not limited to the RFID tag. For example, it may be various electronic components such as a sensor performing wireless communication. In addition, it is applicable to various electronic components embedded in the side wall. For example, the electronic component may be a piezoelectric element or strain sensor.

According to the manufacturing method of the tire 1 according to the present embodiment, the following effects are exerted.

(1) In the present embodiment, a manufacturing method of the tire 1 which manufactures the side-wall rubber 30 as a constituent member of the tire 1 by winding the rubber strip 300 consisting of unvulcanized rubber on the carcass ply 23 serving as a rotating body, the method including: a winding step of winding the rubber strip 300 prior to vulcanization in a spiral manner having a partially overlapping region so that at least part is exposed at the outer surface, and other portions thereof are covered by the rubber strip wound later; and an arrangement step of arranging the RFID tag 40 so that the RFID tag 40 is positioned in a partially overlapping region of the rubber strip 300, or between the carcass ply 23 as the lower layer member of the rubber strip and the rubber strip 300, in the winding step or a step prior thereto. Consequently, it is possible to provide a manufacturing method of a tire having a high degree of freedom in arrangement of the RFID tag 40, which can fine tune the embedding depth position from the tire outer surface in a dimension range no greater than the thickness of the rubber strip 300.

(2) In the present embodiment, the RFID tag 40 is arranged in the arrangement step at the rubber strip 300 after being wound on the carcass ply 23 serving as the rotating body. Consequently, it is possible to arrange the RFID tag 40 at the appropriate position.

(3) In the present embodiment, the RFID tag 40 is arranged at the rubber strip 300 prior to being wound on the carcass ply 23 serving as a rotating body, in the arrangement step. Consequently, it is not necessary to perform arrangement work of the RFID tag 40 during the winding step.

(4) In the present embodiment, in the winding step, regarding the rubber strip 300, the first layer 301 is wound so as to cover the carcass ply 23, etc. as the lower layer member of the rubber strip 300, the second layer 302 is wound so that at least part of the first layer 301 is exposed at the outer surface, the third layer 303 is wound so that at least part of the second layer 302 is exposed at the outer surface, and the fourth layer 304 is wound so that at least part of the third layer 303 is exposed at the outer surface, and in the arranging step, the RFID tag 40 is arranged at any position among between the carcass ply 23, etc. serving as the lower layer member of the rubber strip 300 and the first layer 301, between the first layer 301 and the second layer 302, between the second layer 302 and the third layer 303, and between the third layer 303 and the fourth layer 304. Consequently, in the case of adopting a mode pasting the RFID tag 40 to the rubber strip 300 in advance, a situation such that the RFID tag 40 peels off during the winding step of the rubber strip 300 will hardly occur. In addition, in the case of winding the rubber strip 300 from the inner side in the tire-radial direction, so long as arranging the RFID tag 40 from the first layer to third layer, due to being a position relatively close to the bead filler, which is rubber of high modulus, the RFID tag 40 will hardly be damaged.

(5) In the present embodiment, the rubber strip 300 has a sloped face 310 in at least a part, and the RFID tag 40 is arranged at the sloped face 310 in the arrangement step. Using such a rubber strip 300, and winding the rubber strip 300 in a spiral manner so that the sloped face portion overlaps, the finished shape of the side-wall rubber 30 also becomes favorable. In addition, it is possible to reliably interpose the RFID tag 40 between layers of the rubber strip 300 reliably.

(6) In the present embodiment, the layer of the rubber strip 300 at which arranging the RFID tag 40 is selected based on the desired embedding position M from the tire outer surface, and the desired arrangement position Y1 in the tire-radial direction, in the arrangement step. It is thereby possible to embed the RFID tag 40 at the appropriate position, due to the most appropriate layer of the rubber strip 300 being selected upon arranging the RFID tag according to the embedding position of the RFID tag 40 desired.

Second Embodiment

Next, a tire according to a second embodiment will be explained while referencing FIGS. 10A to 10C. It should be noted that the same reference symbol will be attached for the same configurations as the first embodiment in the following explanation, and detailed explanations thereof will be omitted.

Figure 10A:
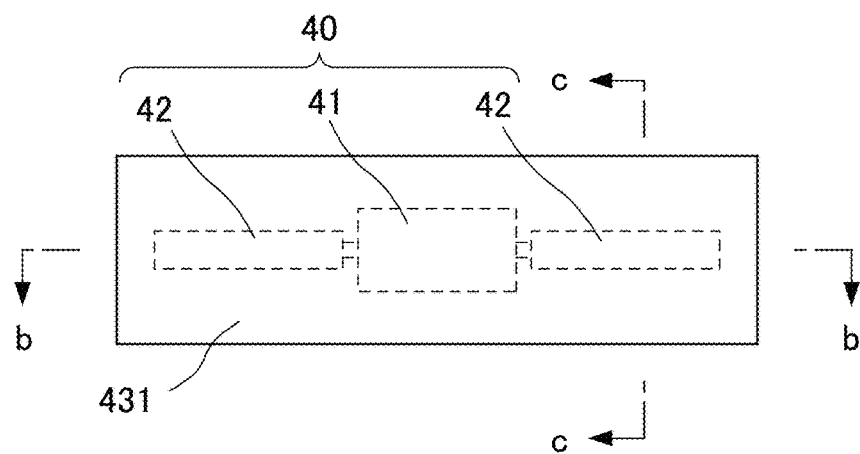
FIG. 10A is a view showing an RFID tag protected by a protective member in a tire according to a second embodiment of the present invention.
Figure 10B:
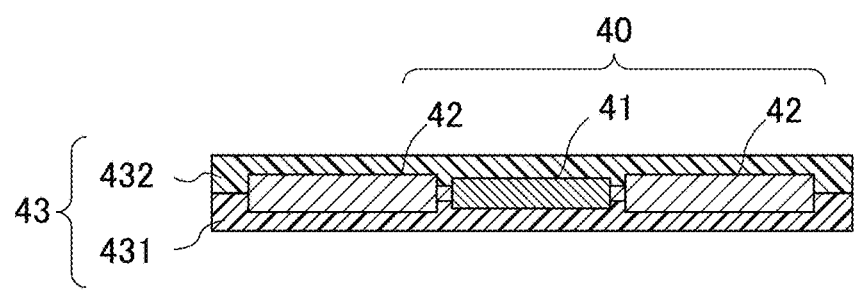
FIG. 10B is a view showing the b-b cross section in FIG. 10A.
Figure 10C:
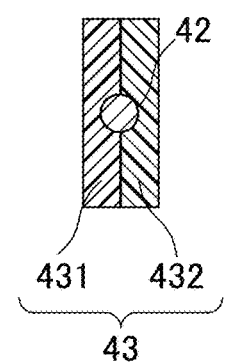
FIG. 10C is a view showing the c-c cross section in FIG. 10A.

FIG. 10A is a view showing the RFID tag 40 covered by the protective member 43 which is constituted from a rubber sheet. In FIG. 10A, the RFID tag 40 is covered by a rubber sheet 431 described later to be hidden. FIG. 10B is a cross-sectional view along the line b-b in FIG. 10A, and FIG. 10C is a cross-sectional view along the line c-c in FIG. 10A. In the present embodiment, the RFID tag 40 is covered by the protective member 43, as shown in FIG. 10. In the second embodiment, the RFID tag 40 protected by such a protective member 43 is embedded in the tire 1.

The RFID tag 40 includes an RFID chip 41 and antenna 42 for performing communication with external equipment. As the antenna 42, a coil-shaped spring antenna, plate-shaped antenna, and various types of rod-shaped antennas can be used. For example, it may be an antenna formed by printing a predetermined pattern on a flexible substrate. When considering the communicability and flexibility, a coil-shaped spring antenna is the most preferable. The antenna is set to an optimized antenna length, according to the frequency band, etc. to be used.

The protective member 43 is configured from two rubber sheets 431, 432 which protect by sandwiching the RFID tag 40.

The protective member 43 is configured by rubber of a predetermined modulus, for example. Herein, the modulus indicates 100% elongation modulus (M100) under a 23° C. atmosphere, measured in accordance with "3.7 stress at a given elongation, S" of JIS K6251:2010.

As the rubber adopted in the protective member 43, rubber at least having a higher modulus than the side wall rubber 30 is used. For example, with the modulus of the side wall rubber 30 as a reference, it is preferable to use rubber of a modulus 1.1 to 2 times as the rubber used in the protective member 43. In addition, by using rubber having a higher modulus than the side wall rubber 30 as the rubber adopted in the protective member 43, since the rigidity changes stepwise in the order of RFID tag 40, protective member 43 side wall rubber 30 or inner liner 29, it is possible to prevent excessive stress from generating within the rubber structure at the embedded part of the RFID tag 40, in the case of the tire deforming.

It should be noted that, in the embodiment shown in FIG. 7, the RFID tag 40 is arranged in a region between the side wall rubber 30 and carcass ply 23, when viewing in the tire-width direction. Therefore, the modulus of the protective member 43 is set to a value higher than the modulus of the side wall rubber 30 and lower than the modulus of the coating rubber of the carcass ply 23. In the case of the modulus within the tire coming to change stepwise, and the tire deforming, it is thereby possible to prevent excessive stress from generated within the rubber structure at the embedded part of the RFID tag 40. In other words, it is possible to suppress the generation of stress.

In addition, the protective member 43 may be configured from a short-fiber filler mixed rubber. As the short-fiber filler, for example, it is possible to use insulating short fibers like organic short fibers such as aramid short fibers and cellulose short fibers; inorganic short fibers such as ceramic short fibers as in alumina short fiber, and glass short fiber. By mixing such short-fiber fillers into rubber, it is possible to raise the strength of the rubber. In addition, as the protective member 43, a rubber sheet in the vulcanized state may be used. The rubber sheet in a vulcanized state does not plastically deform as would raw rubber, and thus can appropriately protect the RFID tag 40.

In addition, as the protective member 43, an organic fiber layer from polyester fibers or polyamide fibers may be provided. It is also possible to embed an organic fiber layer in the two rubber sheets 431, 432.

It should be noted that, considering substantially integrating with the side-wall rubber 30 after vulcanization, rubber of the same properties as the side-wall rubber, or rubber of almost the same modulus may be used as the rubber used in the protective member 43.

In this way, if configuring the protective member 43 by two rubber sheets, since it is possible to thinly form the RFID tag 40 including the protective member 43, it is favorable upon embedding in the tire 1. In addition, when assembling the RFID tag 40 in the constitutional members of the tire 1 prior to vulcanization, the RFID tag 40 covered by the rubber sheets can be installed very easily. For example, at a desired position of a member such as the rubber strip 300 prior to vulcanization, it is possible to appropriately paste the RFID tag 40 covered by the rubber sheets using the adhesiveness of the raw rubber. In addition, by also establishing the rubber sheets as raw rubber prior to vulcanization, it is possible to more easily paste by employing the adhesiveness of the rubber sheet itself as well.

However, the protective member 43 is not limited to the form configured by two rubber sheets, and can adopt various forms. For example, at least one rubber sheet constituting the protective member, so long as covering at least part of the RFID tag 40, can obtain effects such as an improvement in workability in the manufacturing process and stress mitigation. In addition, for example, it may be a configuration wrapping one rubber sheet around the entire circumference of the RFID tag 40, or a configuration attaching the protective member in the form of a potting agent of high viscosity along the entire circumference of the RFID tag 40. Even if such a configuration, it will be possible to appropriately protect the RFID tag 40.

It should be noted that the RFID tag 40 covered by the protective member 43 is embedded in the tire so that the longitudinal direction thereof becomes the direction of the tangential line relative to the circumferential direction of the tire, i.e. direction orthogonal to the paper plane in the cross-sectional view of FIGS. 1 and 2. In addition, the rubber sheets 431, 432 are embedded in the tire in a form such that aligns in the tire-width direction. In other words, in the manufacturing process, one surface of either one of the rubber sheets 431, 432 is pasted to a constituent member of the tire prior to vulcanization, e.g., the rubber strip 300. By establishing such a form, stress will hardly act on the RFID tag 40, even when the tire deforms. In addition, in the manufacturing process, the work of attaching the RFID tag 40 covered by the protective member 43 becomes easy.

According to the tire of the present embodiment, the following effects are exerted in addition to the above (1) to (6).

(7) In the present embodiment, the RFID tag 40 is covered by the protective member 43 consisting of rubber of higher modulus than the side-wall rubber 30, and the RFID tag 40 covered by this protective member 43 is embedded in the tire. Consequently, it is possible to appropriately protect the RFID tag 40.

Third Embodiment

Next, a tire according to a third embodiment will be explained while referencing FIGS. 11 to 17. It should be noted that the same reference symbol will be attached for the same configurations as the second embodiment in the following explanation, and detailed explanations thereof will be omitted. The present embodiment is a particularly favorable embodiment in the case of the antenna of the RFID tag 40 being a coil-shaped spring antenna. In the third embodiment, an electronic component such as the RFID tag 40 having such a coil-shaped spring antenna is embedded in the tire 1.

In the RFID tag 40 of the present embodiment, as the antenna, a coil-shaped spring antenna 421 having high communicability and flexibility can be used. The spring antenna 421 is set to an optimized antenna length, according to the frequency band, etc. to be used.

In the present embodiment, rubber is arranged inside the spring antenna 421 prior to interposing the RFID tag 40 by the two rubber sheets 431, 432 constituting the protective member 43. More preferably, rubber is filled into the spring antenna so that air will not remain as much as possible. This process and the reason for adopting this process will be explained using FIGS. 11 to 17.

Figure 11:
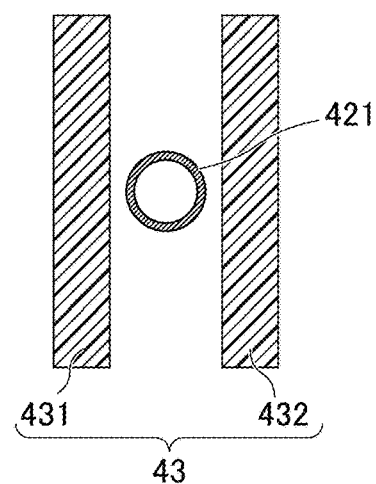
FIG. 11 is a view showing a cross section prior to interposing the RFID tag by rubber sheets, in a case of not filling rubber inside a spring antenna.
Figure 12:
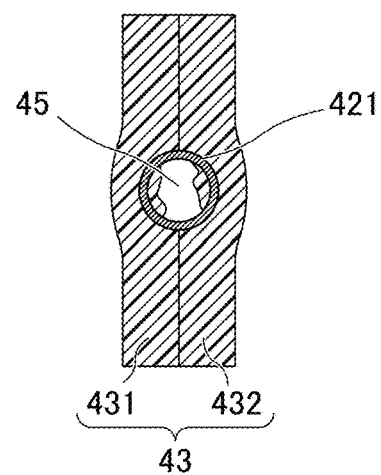
FIG. 12 is a view showing a cross section after interposing the RFID tag by rubber sheets, in a case of not filling rubber inside a spring antenna.

First, a state of the surroundings of the RFID tag 40 in a case of not filling rubber into the spring antenna 421 will be explained as a reference example using FIGS. 11 to 13. FIG. 11 is a view showing a cross section of the spring antenna 421, and rubber sheets 431, 432, prior to interposing the RFID tag 40 by the rubber sheets 431, 432. FIG. 12 is a view showing a cross section of the spring antenna 421, and rubber sheets 431, 432, after interposing the RFID tag 40 by the rubber sheets 431, 432.

As shown in FIG. 12, in this reference example, since rubber is not filled into the spring antenna 421 in advance, a certain amount of air 45 may remain within the spring antenna 421 after interposing by the rubber sheets 431, 432. If air remains in this way, the integrity of the rubber sheets 431, 432 and the spring antenna 421 becomes insufficient, and when the tire deforms, there is concern over the spring antenna 421 not following the motion of the rubber, and the RFID tag 40 having the spring antenna 421 being damaged.

It should be noted that raw rubber before vulcanization is used as the rubber sheets 431, 432 herein. Consequently, by pushing the rubber sheets 431, 432 from both sides, the rubber sheets 431, 432 sticks to some extent inside the spring antenna as shown in FIG. 12. However, very large amounts of time and labor are required in order to stick the rubber sheets 431, 432 until the inside of the spring antenna is completely embedded.

Figure 13:
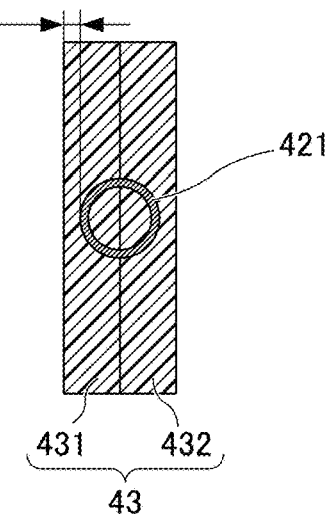
FIG. 13 is a view showing a cross section the RFID tag after interposing by rubber sheets, in a case of not filling rubber inside a spring antenna.

Then, even if assuming a case of taking time and sticking the rubber sheets until the inside of the spring antenna is embedded, the distance L between the outer circumferential part of the spring antenna 421 and the outer surface of the rubber sheets 431, 432 becomes very short, as shown in FIG. 13. In addition, it is difficult to stabilize this distance L, and locally thin portions can occur. Consequently, the protection of the RFID tag 40 by the rubber sheets 431, 42 becomes insufficient, and during vulcanization, there is a possibility of the rubber sheets 431, 432 being damaged.

Therefore, in the present embodiment, prior to interposing the RFID tag 40 by the rubber sheets 431, 432, the rubber is arranged within the spring antenna 421, as shown in FIGS. 14 to 17. More preferably, rubber is filled within the spring antenna so that air does not remain as much as possible. It should be noted that the views shown on the right sides of FIGS. 14 to 17 are views showing a transverse section of the spring antenna 421 and the surrounding thereof.

Figure 14:
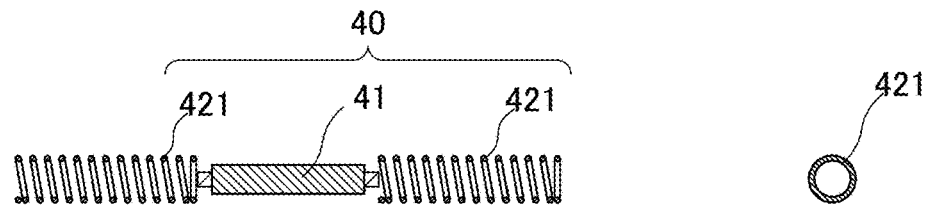
FIG. 14 is a view showing a cross section of the RFID tag prior to filling rubber inside the spring antenna, in a tire according to a third embodiment of the present invention.
Figure 15:
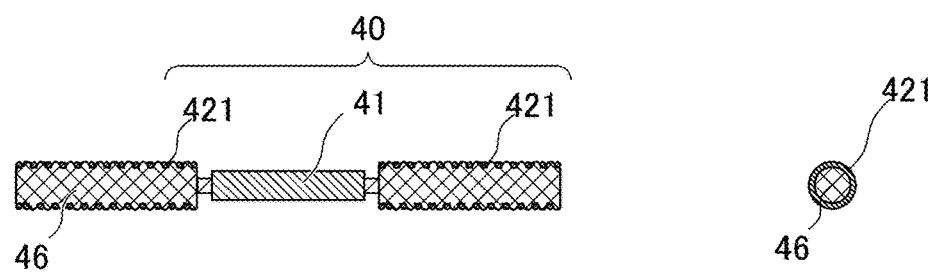
FIG. 15 is a view showing a cross section of the RFID tag after filling rubber inside the spring antenna, in a tire according to the third embodiment of the present invention.

FIG. 14 is a view showing a state prior to filling the rubber 46 into the spring antenna 421, and FIG. 15 is a view section showing a state after filling the rubber 46 into the spring antenna 421. The rubber 46 is embedded so as to be almost the same outside diameter as the outer circumferential face of the spring antenna 421. Then, in the case of the rubber 46 escaping from the outer circumferential face of the spring antenna 421, it is preferable to wipe off this portion. In other words, the outer circumferential face of the rubber 46 is preferably molded so as to become substantially the same surface as the outer circumferential face of the spring antenna 421. It should be noted that the rubber 46 may be filled into the spring antenna 421, and the outer circumference of the spring antenna 421 may be thinly wrapped by the rubber 46. On the other hand, if thickly wrapping the spring antenna 421 by the rubber 46, in addition to the flexibility of the spring antenna 421 being harmed, the dimension in the width direction formed by the rubber sheets 431, 432 after interposing the RFID tag 40 becomes larger, which is not preferable. It should be noted that the rubber 46 may be embedded so as to become substantially the same outside diameter as the inner circumferential face of the spring antenna 421. It is desirable for the outer circumferential part of the rubber 46 to be located within the range of the inner circumferential face and outer circumferential face of the spring antenna 421.

Herein, rubber having flexibility is used as the rubber 46 in order to ensure the flexibility of the spring antenna 421. However, it is preferable to use rubber of a modulus higher than the rubber sheets 431, 432 as the rubber 46, in consideration of the workability, etc. It should be noted that preferably unvulcanized rubber is used as the rubber 46 arranged within the spring antenna 421. By establishing the rubber 46 and rubber sheets 431, 432 as unvulcanized rubber and vulcanizing simultaneously, the integrity of the rubber 46, rubber sheets 431, 432 and spring antenna 421 rises. In addition, the rubber 46, and rubber sheets 431, 432 are more preferably established as the same type of rubber. It should be noted that, by emphasizing the flexibility of the spring antenna 421, rubber of lower modulus than the rubber sheets 431, 432 may be used as the rubber 46. In addition, rubber of substantially the same modulus, and rubber of the same material may be used. It should be noted that vulcanized rubber may be used as the rubber 46 arranged within the spring antenna 421. In addition, rubber-based adhesive, rubber-based filler, etc. can also be used. Taking account of configuring so as not to leave air within the spring antenna 421 as much as possible, while ensuring flexibility, it is possible to adopt various rubber-based materials. As the arranging operation of the rubber 46, various methods can be adopted; however, for example, it is also possible to inject rubber into the spring antenna 421 using a syringe. In this case, a set appropriate amount of the rubber 46 may be filled using a syringe. In addition, after filling a large amount of the rubber 46, portions protruding from the outer circumference of the spring antenna 421 may be wiped off.

Figure 16:
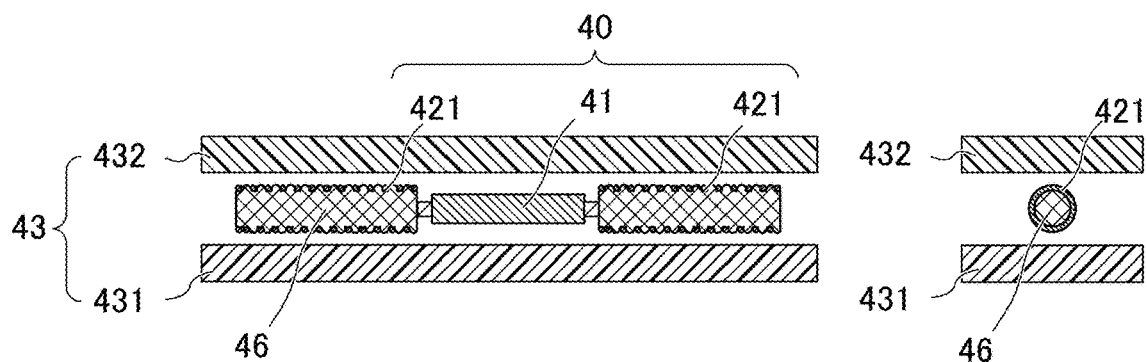
FIG. 16 is a view showing a cross section of the RFID tag prior to interposing by rubber sheets, in a tire according to the third embodiment of the present invention.
Figure 17:
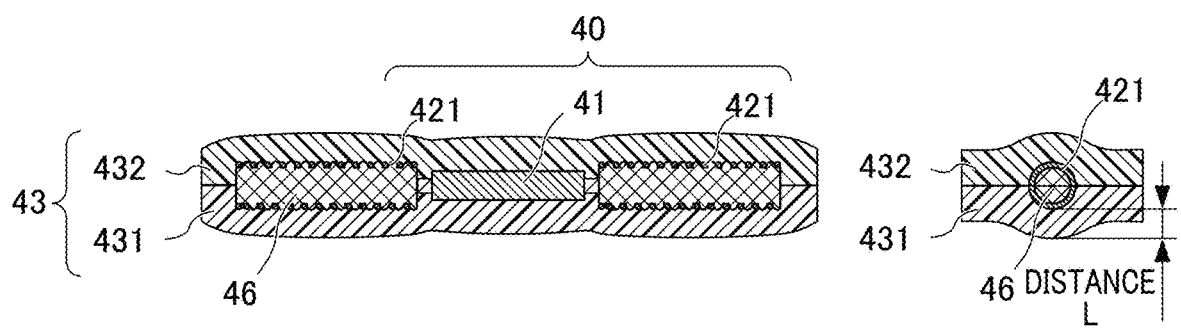
FIG. 17 is a view showing a cross section of the RFID tag interposed by rubber sheets, in a tire according to the third embodiment of the present invention.

FIG. 16 is a view showing a state prior to interposing the RFID tag 40 into which the rubber 46 is filled in the spring antenna 421, by the rubber sheets 431, 432, and FIG. 17 is a view showing a state after interposing by the rubber sheets 431, 432.

As shown in FIG. 17, according to the present embodiment, since the rubber 46 is filled in advance into the spring antenna 421, no air pockets exist between the rubber sheets 431, 432. Consequently, since it is unnecessary to be concerned over air pockets, the process of interposing the RFID tag 40 by the rubber sheets 431, 432 also becomes easy. In addition, by the rubber 46 being arranged within the spring antenna 421, the integrity of the spring antenna 421, rubber 46, and rubber sheets 431, 432 rises, and when the tire deforms, the spring antenna 421 follows the movement of the rubber. Consequently, the durability of the RFID tag 40 having the spring antenna 421 also improves.

In addition, according to the present embodiment, the distance L between the outer circumferential part of the spring antenna 421 and the outer circumferential face of the rubber sheets 431, 432 stabilizes. In other words, a distance close to the thickness of the rubber sheets 431, 432 is generally secured as this distance L. Consequently, the RFID tag 40 is sufficiently protected by the rubber sheets 431, 432. In the present embodiment, the RFID tag 40 interposed by the rubber sheets 431, 432 is arranged at the rubber strip 300 or the like, and subsequently, the green tire is vulcanized.

According to the tire of the present embodiment, the following effects are exerted in addition to the above (1) to (7).

(8) In the present embodiment, provided are a step of arranging the rubber 46 inside the spring antenna 421 of the RFID tag 40 serving as an electronic component having a communication function; a step of interposing by the rubber sheets 431, 432 the RFID tag 40 having the spring antenna 421 in which the rubber 46 is arranged; and a setting step of fixedly setting the RFID tag 40 interposed by the rubber sheets 431, 432 in the tire 1. Air 45 will thereby not remain inside the spring antenna 421. In addition, since it is unnecessary to be concerned over air pockets, the work for interposing the RFID tag 40 by the rubber sheets 431, 432 also becomes easy. In addition, since the distance L between the outer circumferential part of the spring antenna 421 and the outer surface of the rubber sheets 431, 432 is stabilized, the RFID tag 40 is sufficiently protected by the rubber sheets 431, 432. In the case of an embodiment in which the RFID tag 40 is embedded between the second pad 36 and side wall rubber 30 as in the tire 1 of the present embodiment, i.e. case of being embedded in a portion of the tire 1 near the outer surface, such air pocket countermeasures and enhanced protection measures are particularly effective.

It should be noted that, although a mode forming the side-wall rubber 30 as a constituent member of the tire by winding the rubber strip 300 consisting of unvulcanized rubber on a rotating body has been explained in the embodiment, the present invention is not to be limited thereto. For example, it is also possible to apply to a mode forming the tread rubber 28 as a constituent member of the tire by winding the rubber strip consisting of unvulcanized rubber on the rotating body. Even in this case, it is possible to fine tune the embedding depth position from the tire outer surface in a dimension range no greater than the thickness of the ribbon-shaped rubber strip 300. It should be noted that, although the tire of the present invention can be adopted as various types of tires such as for cars, light trucks, trucks and buses, it is particularly suitable as a tire for passenger cars. It should be noted that the present invention is not to be limited to the above-mentioned embodiments, and that even when carrying out modifications, improvements, etc. within a scope capable of achieving the object of the present invention, it is encompassed by the scope of the present invention.

What is claimed is:

1. A tire manufacturing method for a tire which manufactures a constituent member of the tire by winding a rubber strip formed of unvulcanized rubber, the rubber strip having, in a cross-section, a sloped face in at least a part thereof, the tire manufacturing method comprising:
rotating a molding drum and a body arranged on the molding drum;
winding the rubber strip, prior to vulcanization, on the rotating body in a spiral manner having a partially overlapping region, so that at least part thereof is exposed at an outer surface, and another portion thereof, which includes at least part of the sloped face, is covered by the rubber strip after being wound; and
arranging an electronic component at the sloped face so that the electronic component is positioned in the partially overlapping region of the rubber strip, in the winding step, wherein the electronic component is covered by a protective member that includes a rubber sheet having a modulus 1.1 to 2 times greater than a modulus of the rubber strip and lower than a modulus of coating rubber of a carcass ply of the tire.

2. The tire manufacturing method according to claim 1, wherein, in the arranging step, the electronic component is arranged at the rubber strip after at least a portion of the rubber strip is wound on the rotating body.

3. The tire manufacturing method according to claim 1, wherein, in the arranging step, the electronic component is arranged at the rubber strip prior to being wound on the rotating body.

4. The tire manufacturing method according to claim 1, wherein, in the winding step, a first layer is wound so as to cover a lower layer member of the rubber strip, a second layer is wound so that at least part of the first layer is exposed at the outer surface, a third layer is wound so that at least part of the second layer is exposed at the outer surface, and a fourth layer is wound so that at least part of the third layer is exposed at the outer surface, and, in the arranging step, the electronic component is disposed at any position among: between the first layer and the second layer, between the second layer and the third layer, and between the third layer and the fourth layer.

5. The tire manufacturing method according to claim 1, wherein a layer of the rubber strip at which arranging the electronic component is selected in the arranging step is based on a desired embedding depth position from the tire outer surface, and a desired arrangement position in a tire-radial direction.

6. The tire manufacturing method according to claim 1, wherein the electronic component is arranged so that a longitudinal direction thereof becomes a direction of a tangential line to a circumferential direction of the tire.

* * * * *